United States Patent [19]

Aper

[11] Patent Number: 4,887,859
[45] Date of Patent: Dec. 19, 1989

[54] MOTOR VEHICLE HAVING A CENTRAL EXTENSION SECTION

[76] Inventor: Ludwig Aper, Julianenstrasse 10, D-6524 Guntersblum, Fed. Rep. of Germany

[21] Appl. No.: 138,194
[22] PCT Filed: Apr. 19, 1985
[86] PCT No.: PCT/DE85/00127
§ 371 Date: Nov. 19, 1987
§ 102(e) Date: Nov. 19, 1987
[87] PCT Pub. No.: WO86/06337
PCT Pub. Date: Nov. 6, 1986

[51] Int. Cl.⁴ .............................................. B62D 63/02
[52] U.S. Cl. ..................................... 296/26; 296/196; 296/197
[58] Field of Search ................... 180/209; 296/26, 196, 296/197, 195, 35.3, 56, 106

[56] References Cited

U.S. PATENT DOCUMENTS 2,678,231 11/1954 Barényi ................. 296/196
4,342,146 8/1982 Hanson ................. 296/26

FOREIGN PATENT DOCUMENTS 885206 9/1955 Fed. Rep. of Germany ...... 296/196
2403088 7/1975 Fed. Rep. of Germany ...... 296/196
2617277 11/1977 Fed. Rep. of Germany ...... 296/26
3414617 10/1985 Fed. Rep. of Germany ...... 296/26
122260 7/1983 Japan ............................ 296/26
81/02555 9/1981 PCT Int'l Appl. ............. 296/197

Primary Examiner—Charles A. Marmor
Assistant Examiner—Karin Tyson
Attorney, Agent, or Firm—Marmorek, Guttman & Rubenstein

[57] ABSTRACT

The vehicle has a forward section (1) containing the engine and seating for three people, being carried on four wheels (5,6). Behind the forward section can be fixed a central extension section (2), for carrying additional passengers and which runs on its own support wheels (7). On the rear of the extension section (8) or the rear of the forward section (1) a rear section comprises an openable tail gate (3) and bumper bar (4). The sections have bolt plates on the upper panel and cross members at the base, by which the sections can be bolted together, with a torsion bar (11) bolted between the vehicle section suspension legs (12).

1 Claim, 3 Drawing Sheets

MOTOR VEHICLE HAVING A CENTRAL EXTENSION SECTION

The instant invention relates to a motor vehicle.

In all known types of motor vehicles the disadvantage exists that the size of the passenger space is determined by the design and cannot be changed. In practice however, the requirements for the size of the passenger space are constantly changing. A family car should be sized so as to accommodate a growing family. On the other hand, a family car is extensively used in city traffic without all of the family members riding in it. These varying requirements with respect to the size of the passenger space have led to the disadvantage that many families equip themselves with two passenger cars of different sizes, and this involves considerable additional cost and additional effect upon the environment.

It is the object of the instant invention to overcome these disadvantages and to propose a motor vehicle which makes available changeable carrying capacities for varying demands so that the need of acquiring and maintaining two motor vehicles is eliminated.

This objective is achieved through the invention by a forward section of the motor vehicle containing the driving mechanism, a removable middle section (module) and a removable rear wall which can be alternately attached to the middle section or to the forward section.

The middle section is preferably supported on its own pair of wheels.

The rear wall can be subdivided into a rear apron and a hinged rear door.

The middle section and the rear wall are preferably capable of being attached to the forward section by screw connection means of identical configuration.

A three-point screw connection distributed over the vehicle width can be provided on the lower edges of the three motor vehicle sections to be brought into contact with each other and a two-point connection constituted by a pair of screws for each two-point connection can be provided on the upper edges to be brought into contact with each other.

It is useful to provide two longitudinally extending connecting rods (stabilizers) between the upper and the lower screw connection means, said connecting rods engaging by their two ends through easy-to-open connecting means into the upper ends of the shock absorbing leg of the rear pair of wheels of the forward section and of the shock absorbing legs of the pair of wheels of the middle section.

The forward section is preferably widened so as to accommodate three seating spaces next to each other.

An embodiment of the invention is explained below in greater detail through the drawings in which FIG. 1 is a side view of a passenger car consisting of three parts, with three components shown in an exploded view;

Figure 1:
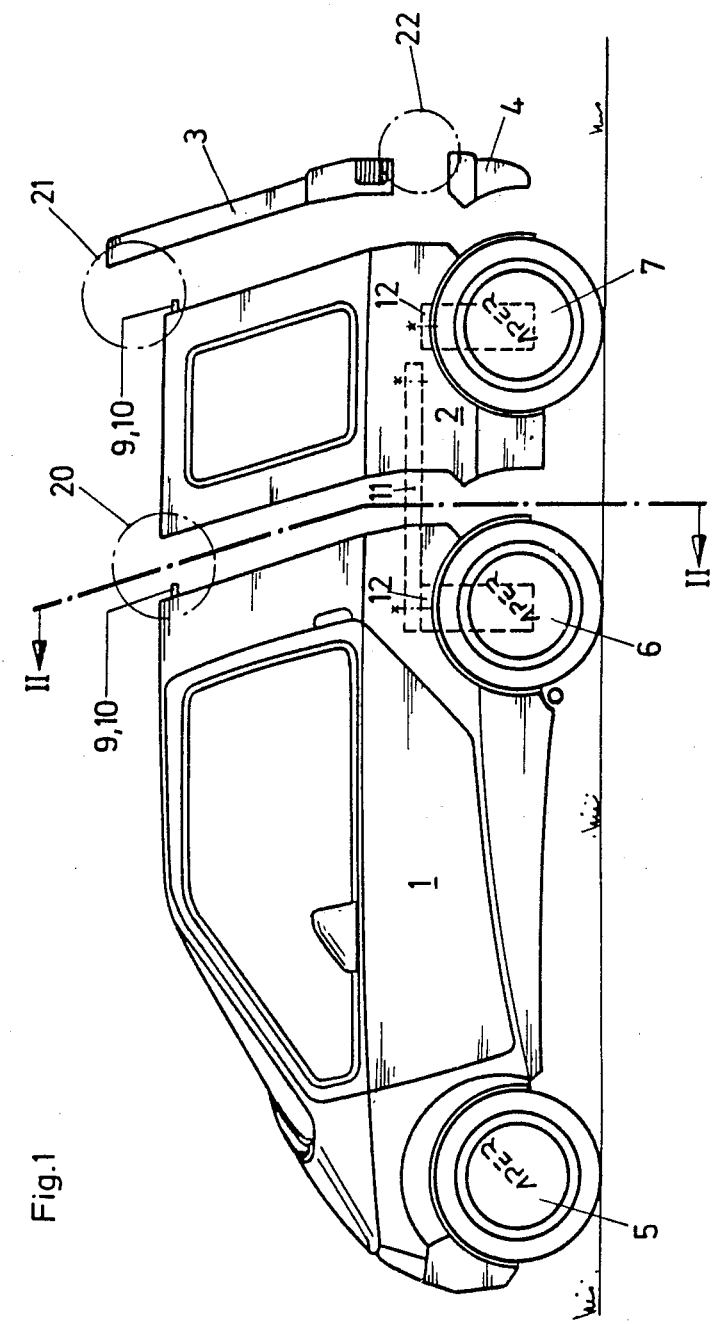

It can be seen from the schematic representation of FIG. 1 that the passenger car consists of a forward section 1 containing a driving mechanism 1, a removable middle section 2 which increases the passenger space and a removable rear wall 3, 4 which can be attached either to the middle section 2 or to the forward section 1.

The forward section is equipped with two pairs of wheels 5,5 and 6,6 whereas the middle section 2 has a pair of running wheels 7,7.

The rear wall is preferably made in two sections and consists of a lifting hinged rear door 3 and a rear apron 4.

Figure 2:
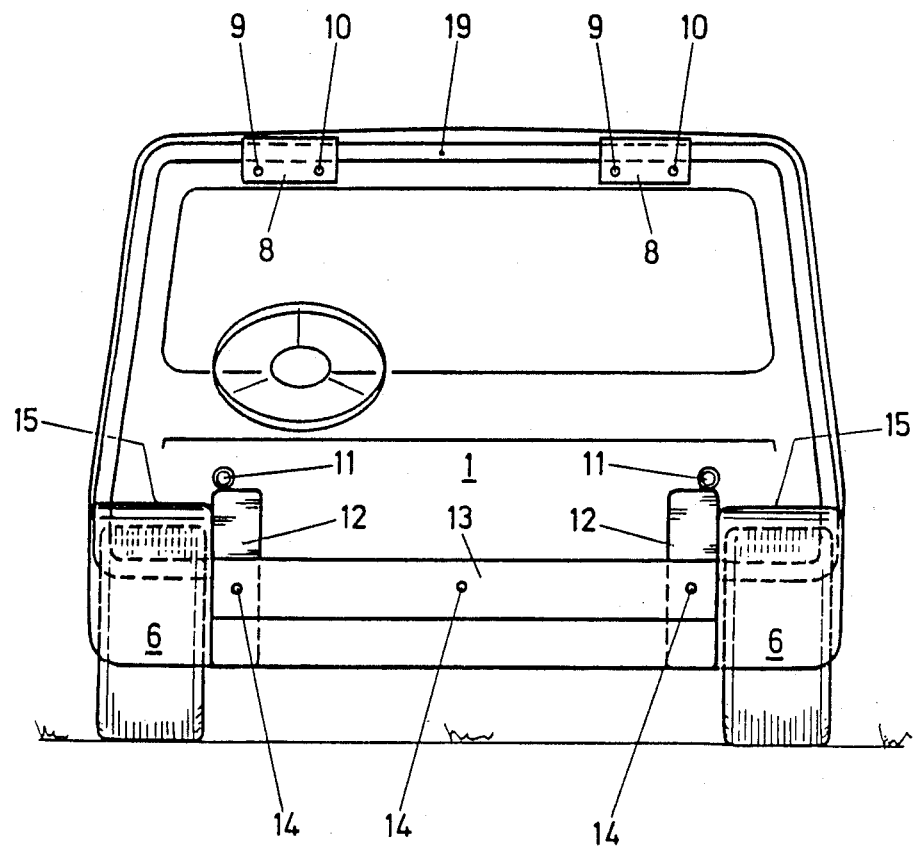
FIG. 2 is a cross-section along the cutting line II—II in FIG. 1.

The representation according to FIG. 2 shows the type and arrangement of the detachable connecting means by which the middle section 2 can be connected to the forward section 1 and can again be separated from it. The forward section 1 is provided with a cross piece 13 with three perforations 14, 14, 14 into which connecting screws (not shown in the drawing) can be inserted. The forward lower edge of the middle section 2 is formed accordingly, so that two cross sections 13, 13 can be connected to each other by means of three screws.

Each of two contact plates 8, 8, attached to the upper edge, is provided with two pin screws or screw bolts 9, 10 capable of being introduced into correspondingly formed contact plates 8,8' on the forward upper edge of middle section 2.

An additional mutual connection of the two mentioned sections is furthermore provided by connecting rods 11,11 (stabilizers) running in longitudinal direction which engage through easy-to-open connecting means into the upper ends of shock absorbing legs 12,12 of the pair of wheels 6,6 and of the pair of running wheels 7,7 of the middle section 2. The shock absorbing legs 12,12 are firmly connected to the wheel housings 15,15.

Figure 3:
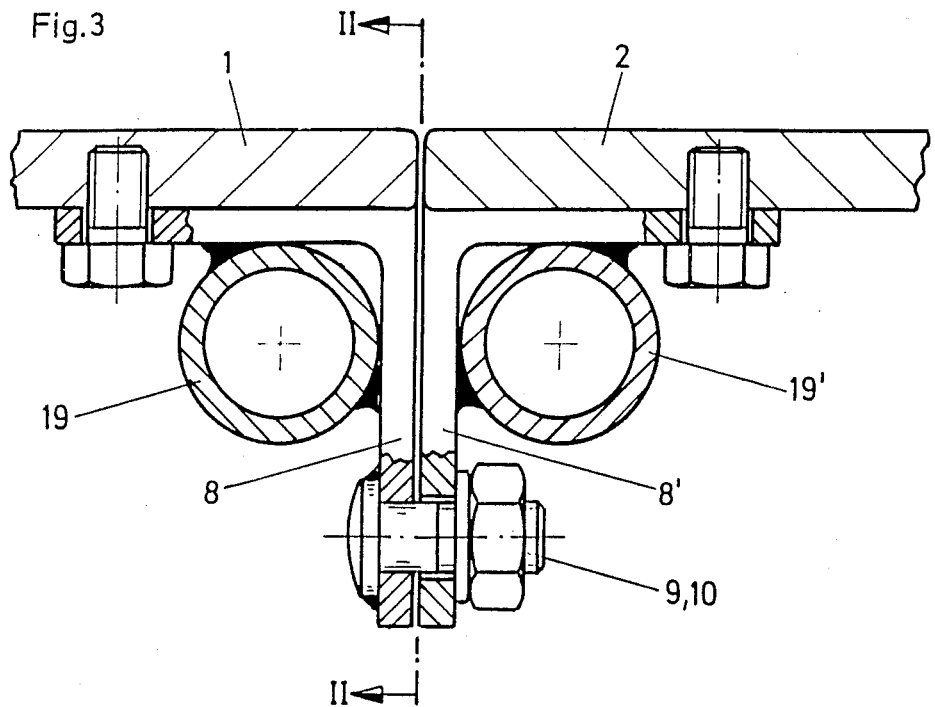
FIG. 3 is an enlarged detail from FIG. 1.

FIG. 3 shows an enlarged representation of an embodiment of the connecting means which is comprised within the circle 20 of FIG. 1.

The contact plates 8 are firmly connected to a transversal pipe frame 19 and to the roof of the forward section 1. The screw bolts 9,10 which are firmly connected to the contact plates 8 reach through corresponding perforations in the facing contact plates 8,8' of identical configuration of the middle section 2 which are in turn attached to the transversal rods 19,19.

Figure 4:
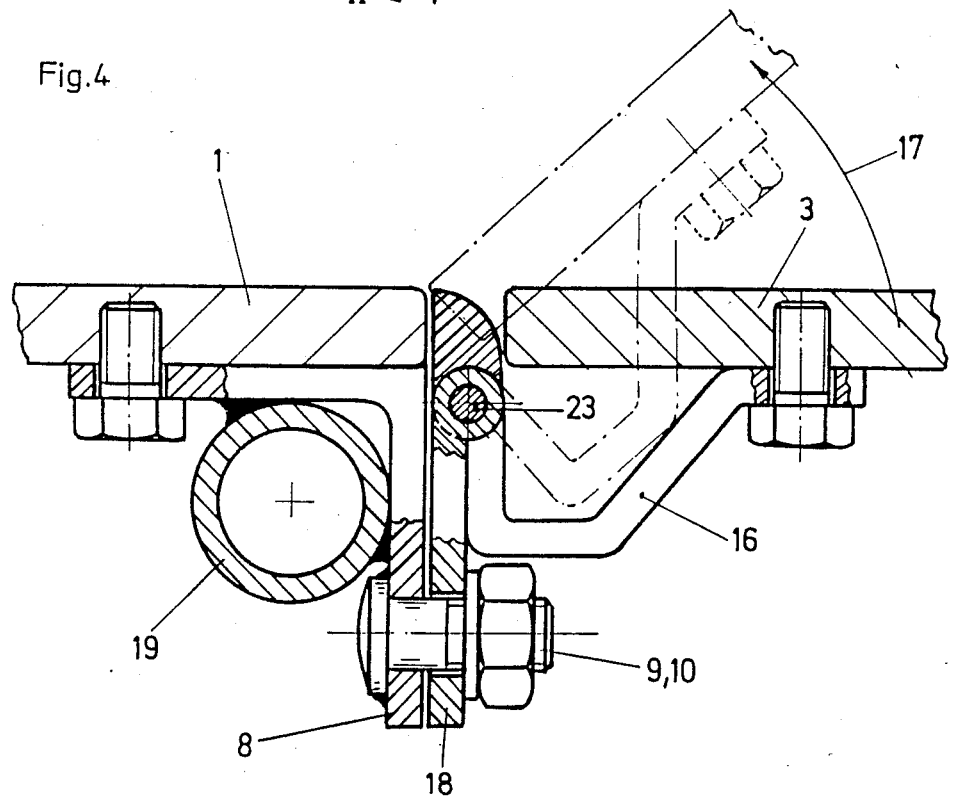
FIG. 4 is another enlarged detail from FIG. 1.

FIG. 4 shows an example of a different embodiment of the connection within the area of detail defined by a circle 21 in FIG. 1. Because of an additional hinged link 23 this form of connection makes it possible to open the rear door 3 upward in the direction of arrow 17 as a part 16 is made so as to be capable of movement in relation to as part 18 of the contact plate of the rear wall.

In the area indicated by the detail circle 22 of FIG. 1 conventional, detachable connecting means (not shown in detail) are provided and are of the type of the known luggage compartment cover locks.

I claim:

1. Motor vehicle comprising a forward section containing the driving mechanism,
   a removable middle section,
   a removable rear wall which alternately can be connected to the middle section or to the forward section,
   connecting means operable to connect said middle section and said rear wall to said forward section,
   said connecting means comprising an upper multiple screw connection means for connecting edges of said sections and said wall, and
   a lower multiple screw connection means for connecting edges of said sections and said wall,
   and two longitudinally extending connecting rods disposed between the upper and the lower screw connection means, said forward section comprising rear wheels and shock absorbers including legs having upper ends,
said middle section including wheels and shock absorbers including legs having upper ends,
said connecting rods releasably connected with their two ends to the upper ends of the shock absorbing legs of the rear wheels of the forward section and of the shock absorbing legs of the wheels of the middle section.

* * * * *